(12) United States Patent
Buriol et al.

(10) Patent No.: US 7,593,341 B1
(45) Date of Patent: Sep. 22, 2009

(54) METHOD AND APPARATUS FOR UPDATING A SHORTEST PATH GRAPH

(75) Inventors: Luciana Buriol, Porto Alegre (BR); Mauricio Guilherme de Carvalho Resende, Holmdel, NJ (US); Mikkel Thorup, Florence, MA (US)

(73) Assignee: AT&T Corp., New York, NY (US)

( * ) Notice: Subject to any disclaimer, the term of this patent is extended or adjusted under 35 U.S.C. 154(b) by 519 days.

(21) Appl. No.: 11/450,530

(22) Filed: Jun. 8, 2006

(51) Int. Cl.
*G06F 11/00* (2006.01)
*H04L 12/28* (2006.01)
*G06F 15/173* (2006.01)

(52) U.S. Cl. .................. 370/238; 370/256; 370/408; 709/241; 709/242; 716/13

(58) Field of Classification Search ............ 370/238, 370/238.1, 221, 235, 237, 252, 389, 400, 370/401–408; 709/238, 239, 240–243; 716/13
See application file for complete search history.

(56) References Cited

U.S. PATENT DOCUMENTS

| 4,987,536 | A  | * | 1/1991 | Humblet .............. 709/241 |
| 6,247,077 | B1 | * | 6/2001 | Muller et al. .......... 710/74 |
| 6,704,320 | B1 | * | 3/2004 | Narvaez et al. ........ 370/408 |
| 7,343,424 | B2 | * | 3/2008 | Amato ................. 709/241 |
| 7,362,709 | B1 | * | 4/2008 | Hui et al. ............. 370/237 |

* cited by examiner

*Primary Examiner*—Afsar M. Qureshi

(57) ABSTRACT

A method and apparatus for updating a shortest path graph or a shortest path tree are disclosed. For example, an arc weight is changed for an arc in the network, where a plurality of affected nodes in the network is determined. The distance of each of the affected nodes is determined, where a subset of the plurality of affected nodes is then placed in a heap. One aspect of the present invention is that not all the affected nodes are placed in the heap. In one embodiment, the present reduced heap approach only applies the Dijkstra's algorithm to those affected nodes whose distances change in a smaller amount that the change in the arc weight. In turn, the shortest path graph or the shortest path tree is updated in accordance with the affected nodes placed in the heap.

15 Claims, 4 Drawing Sheets

METHOD AND APPARATUS FOR UPDATING A SHORTEST PATH GRAPH

The present invention relates generally to communication networks and, more particularly, to a method and apparatus for updating a shortest path graph for packet networks such as Voice over Internet Protocol (VoIP) or SoIP (Service over Internet Protocol) networks.

BACKGROUND OF THE INVENTION

Internet protocol (IP) traffic follows rules established by routing protocols. Shortest path based protocols, such as Open Shortest Path First (OSPF), direct traffic based on arc weights assigned by the network operator. Each router computes shortest paths and creates destination tables used for routing flow on the shortest paths. It is also the role of the routing protocol to specify how the network should react to changes in the network topology, such as changes in arc weights. However, arc weights may change for various reasons, e.g., failure of an arc, maintenance being performed on one or more links within an arc, congestion, new weight assignment from the network operator, and the like. When an arc weight is changed on an arc (e.g., increased or decreased), a dynamic shortest path algorithm is triggered, e.g., within each node, to update the shortest paths within the affected network taking into account the change in the arc weight. However, running the dynamic shortest path algorithm is a time consuming method, i.e., a computationally expensive method.

Therefore, a need exists for a method and apparatus for accelerating the update of a shortest path graph for networks such as packet networks.

SUMMARY OF THE INVENTION

In one embodiment, the present invention provides a method for updating a shortest path graph or a shortest path tree. For example, an arc weight is changed for an arc in the network, where a plurality of affected nodes in the network is determined. The distance of each of the affected nodes is determined, where a subset of the plurality of affected nodes is then placed in a heap. One aspect of the present invention is that not all the affected nodes are placed in the heap. In one embodiment, the present reduced heap approach only applies the Dijkstra's algorithm to those affected nodes whose distances change in a smaller amount that the change in the arc weight. In turn, the shortest path graph or the shortest path tree is updated in accordance with the affected nodes placed in the heap.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Although the present invention is described below in the context of a packet network, e.g., a VoIP or a SoIP network, the present invention is not so limited. Namely, the present invention can be implemented in any type of networks that may benefit from the present method for accelerating the update of a shortest path graph, e.g., a transportation network and the like. Although the present invention is disclosed in the context of updating a shortest path graph, it is intended to broadly cover the updating of a shortest path tree as well.

Figure 1:
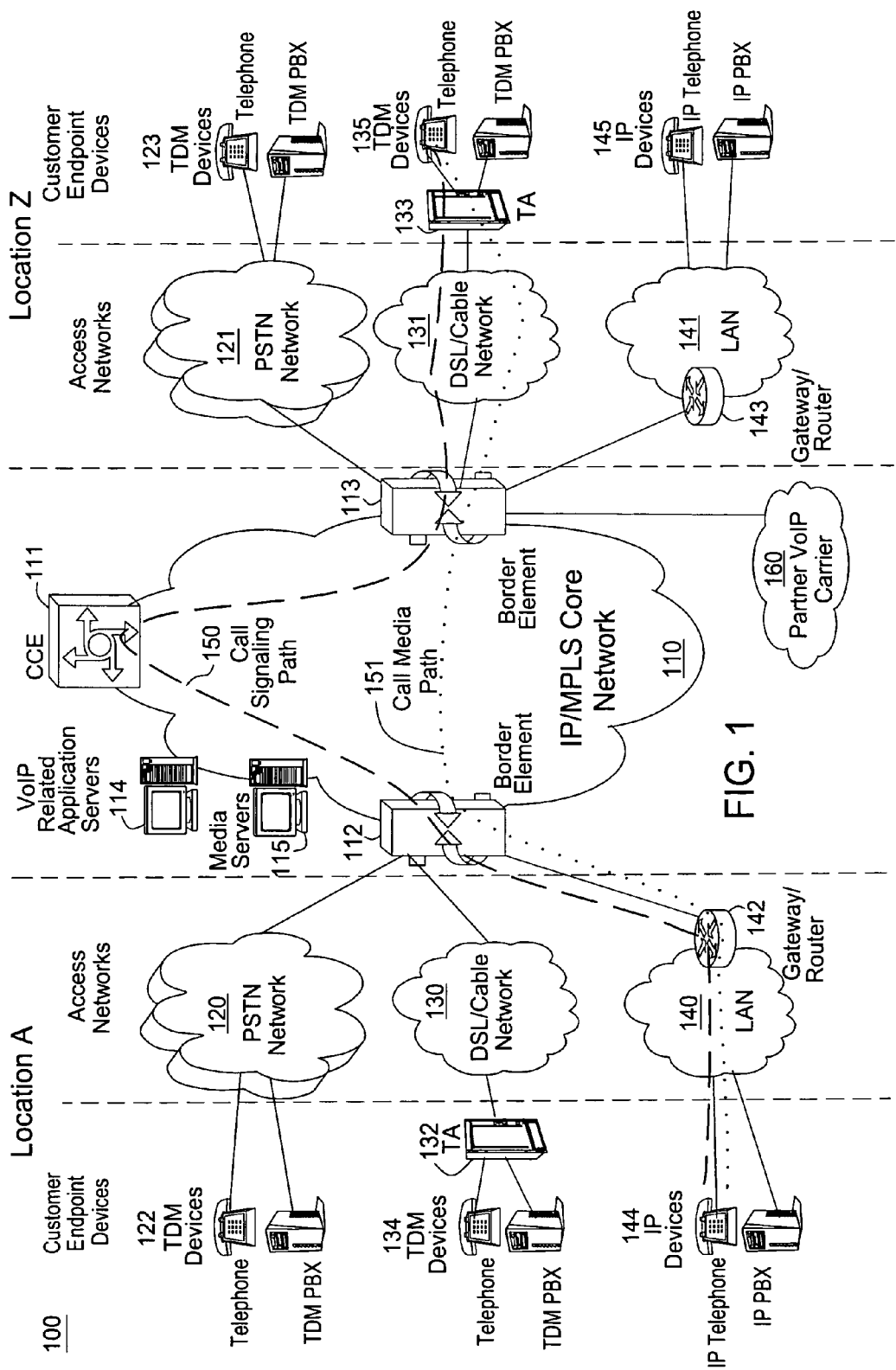
FIG. 1 illustrates an exemplary Internet Protocol (IP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Packet network operators, e.g., VoIP or SoIP service providers, must often maintain an efficient network to support the traffic or load that is placed on the network. FIG. 1 illustrates the complexity in today's networks, where numerous Autonomous Systems (e.g., each of the networks, or a collection of the networks as shown) are communicating with each other using routers and various communication channels or links. In fact, within each Autonomous System, there are numerous communication channels or arcs that may connect a plurality of core routers, e.g., core routers (not shown) that assist in forwarding packets from BE 112 to BE 113 in core network 110. However, arc weights may change for various reasons, e.g., failure of an arc, maintenance being performed on one or more links within an arc, congestion, new weight assignment from the network operator, and the like. When an arc weight is changed on an arc (e.g., increased or decreased), a dynamic shortest path algorithm is triggered, e.g., within each node, to update the shortest paths within the affected network taking into account the change in the arc weight. However, running the dynamic shortest path algorithm is a time consuming method, i.e., a computationally expensive method.

To address this need, the present invention discloses a method for updating a shortest path graph for packet networks. In one embodiment, the present invention describes a novel method that allows the reduction of heap sizes used by dynamic single destination shortest path algorithms. For example, for unit weight changes, the updates can be accomplished without heaps.

The Internet is the global network of interconnected communication networks, made up of routers and links connecting the routers. On a network level, the Internet is built up of several autonomous systems (ASs) that typically fall under the administration of a single institution, such a company, a university, or a service provider. For example, routing within a single AS is done by an Interior Gateway Protocol (IGP), while an Exterior Gateway Protocol (EGP) is used to route traffic flow between ASs. IP traffic is routed in small chunks called packets. A routing table instructs the router how to forward packets. Given a packet with an IP destination address in its header, the router retrieves from the table the IP address of the packet's next hop.

OSPF (Open Shortest Path First) is the most used intra-domain routing protocol. For this protocol, an integer weight must be assigned to each arc, and the entire network topology and weights are known to each router. With this information, each router computes the graphs of shortest (weight) paths from each other router in the AS to itself. The graphs need not be trees, since all shortest paths between two routes need to be considered. Demands are routed on the corresponding shortest path graphs.

The arcs weights can be assigned by the AS operator. The lower the weight, the greater the chance that traffic will get routed on that arc. Different weight settings lead to different traffic flow patterns. Weights can be set to optimize network performance, such as minimize congestion as well as to minimize network design cost.

Finding a shortest path is a fundamental graph problem, which besides being a basic component in many graph algorithms, has numerous real-world applications. Consider a weighted directed graph $G=(V, E, w)$, where V is the vertex set, E is the arc set, and $w \in \mathbb{R}^{|E|}$ is the arc weight vector. Given a source vertex s∈V, the single source shortest path problem is to find a shortest path graph $g^{SP}$ from source s to every vertex v∈V. By reversing the direction of each arc in the graph, the single source is transformed into the single destination shortest path problem.

There are applications where $g^{SP}$ is given and must be updated after a weight change. Considering a single weight change, usually only a small part of the graph is affected. For this reason, it is sensible to avoid the computation of $g^{SP}$ from scratch, but only update the part of the graph affected by the arc weight change. This problem is known as the Dynamic Shortest Path (DSP) Problem. An algorithm is referred to as fully-dynamic if both arc deletion (arc weight is set as ∞) and insertion are supported, and semi-dynamic incremental (decremental) if only arc deletion (insertion) is supported.

The present invention presents a new technique that allows the reduction of heap (e.g., priority queue) sizes in dynamic shortest path algorithms. For example, for unit weight changes, the updates are done without heaps for most of the algorithms. Suppose an arc weight is changed by Δ. In various standard implementations of DSP algorithms, all affected nodes (whose distances have changed) will be placed in a heap, on which a Dijkstra subroutine is run. The Dijkstra's algorithm or subroutine is an algorithm that solves the single-source shortest path problem for a directed graph with non-negative edge weights. However, nodes in a subset of the affected nodes will have their distances changed exactly by Δ. In one embodiment, in this case, an update without heaps can be applied. The basic approach of the present reduced heap method is to apply the Dijkstra algorithm or subroutine only for those nodes whose distances change in a smaller amount than Δ. In the worst case, the Dijkstra subroutine may, of course, be applied to all affected nodes. But often, in practice, the subset of affected nodes whose distances decrease exactly by Δ is large. Avoiding to use heaps for this set almost always results in substantial savings, reducing the computational times for the DSP algorithms.

In the present disclosure, the algorithms are named as "increase" and "decrease", instead of adopting the nomenclature "incremental" and "decremental" used for arc insertion and deletion, respectively. It is noted that deleting an arc, as in a decremental algorithm, can be viewed as increasing its weight to infinity. However, the focus here is more general, allowing not only insertions and deletions, but also arc weight changes by any amount. The dynamic algorithms to update the graph after an arc weight increase are called increase algorithms, while decrease algorithms update a graph after an arc weight decrease. The algorithms are named with the letter G or T if they update a shortest path graph or tree, respectively. The names also indicate the originators of the algorithms (in superscript) and the sign + or − (in subscript) if it refers to an increase or decrease algorithm, respectively. When the name of the algorithm is used without the sign, it refers to both the increase and decrease cases, or it is followed by the Incr or Decr indication. The terms std and rh are used to refer to the standard and reduced heap variants of the algorithms. The standard algorithms were originally designed to update single-source shortest paths in directed graphs with real positive arc weights, but in the present disclosure, the algorithms are used to update single-destination shortest paths instead.

Figure 2:
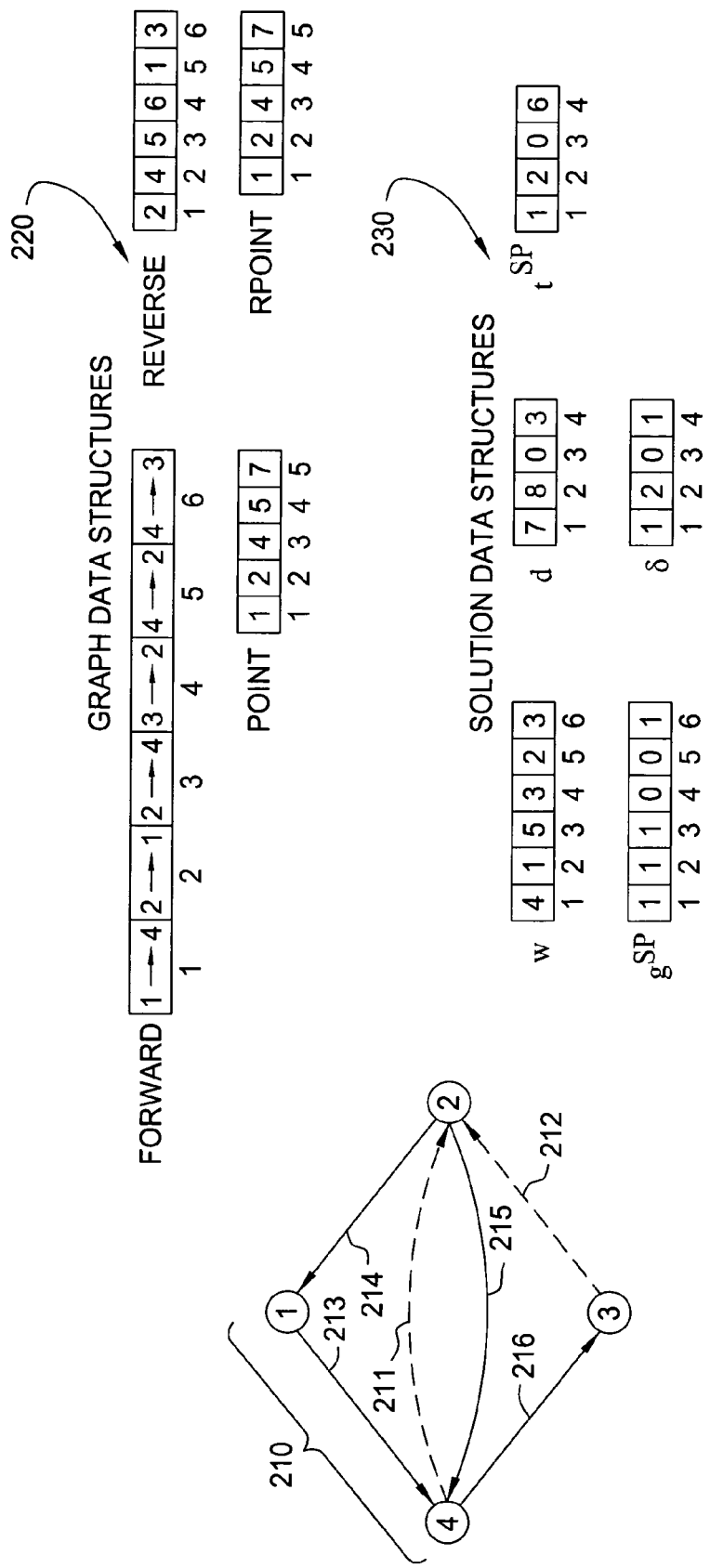
FIG. 2 illustrates exemplary data structures of the present invention.

The data structures used to represent the graph and the solution (graph or tree) are now presented. In one embodiment, two sets of data structures are used in the implementations of the present method. The first data structure is used to represent the input graph, while the other represents the solution. FIG. 2 shows a graph 210 (on the left) and its corresponding data structures (on the right). The arcs not belonging to a shortest path are represented by dashed lines 211, 212, while the others 213, 214, 215, 216 comprise the shortest path graph considering node 3 as the destination. The data structures on top 220 are used for representing the input graph, while the data structures 230 on the bottom represent a shortest path graph solution (w,d,$g^{SP}$ and δ) and a shortest path tree solution (w,d, and $t^{SP}$).

In one embodiment, the input graph is stored in forward and reverse representations. It is represented by four arrays. The |E|-array forward stores the arcs, where each arc consists of its node indices tail and head. The arcs in this array are sorted by their tails, with ties broken by their heads. The i-th position of the |E|+1-array point indicates the initial position in forward of the list of outgoing arcs from node i. By assumption, the last position in forward of the list of outgoing arcs from node i is point [i+1]−1.

The |E|-array reverse stores the arcs, where the arcs are sorted by their heads, with ties broken by there tails. To save space, each arc in reverse is represented by the index of this arc in forward. The i-th position of the |E|+1-array rpoint indicates the end position in reverse of the list of incoming arcs into node i. By assumption, the last position in reverse of the list of incoming arcs into node i is rpoint [i+1]−1.

Solutions are represented in different algorithms either as trees or graphs. For both cases, the |E|-array w stores the arc weights, and the |V|-array d stores the distances of the nodes to the destination.

In the case of trees, the i-th position of the |V|-array $t^{SP}$ indicates the index of the outgoing arc of node i in the shortest path tree. The destination node stores the value 0, i.e., $t_d^{SP}$=0.

In the case of graphs, two arrays are used. The |E|-array $g^{SP}$ is an 0-1 indicator array whose i-th position is 1, if and only if arc i is in the shortest path graph. Finally, the i-th position of the |V|-array δ stores the number of arcs in the shortest path graph outgoing node i.

Figure 3:
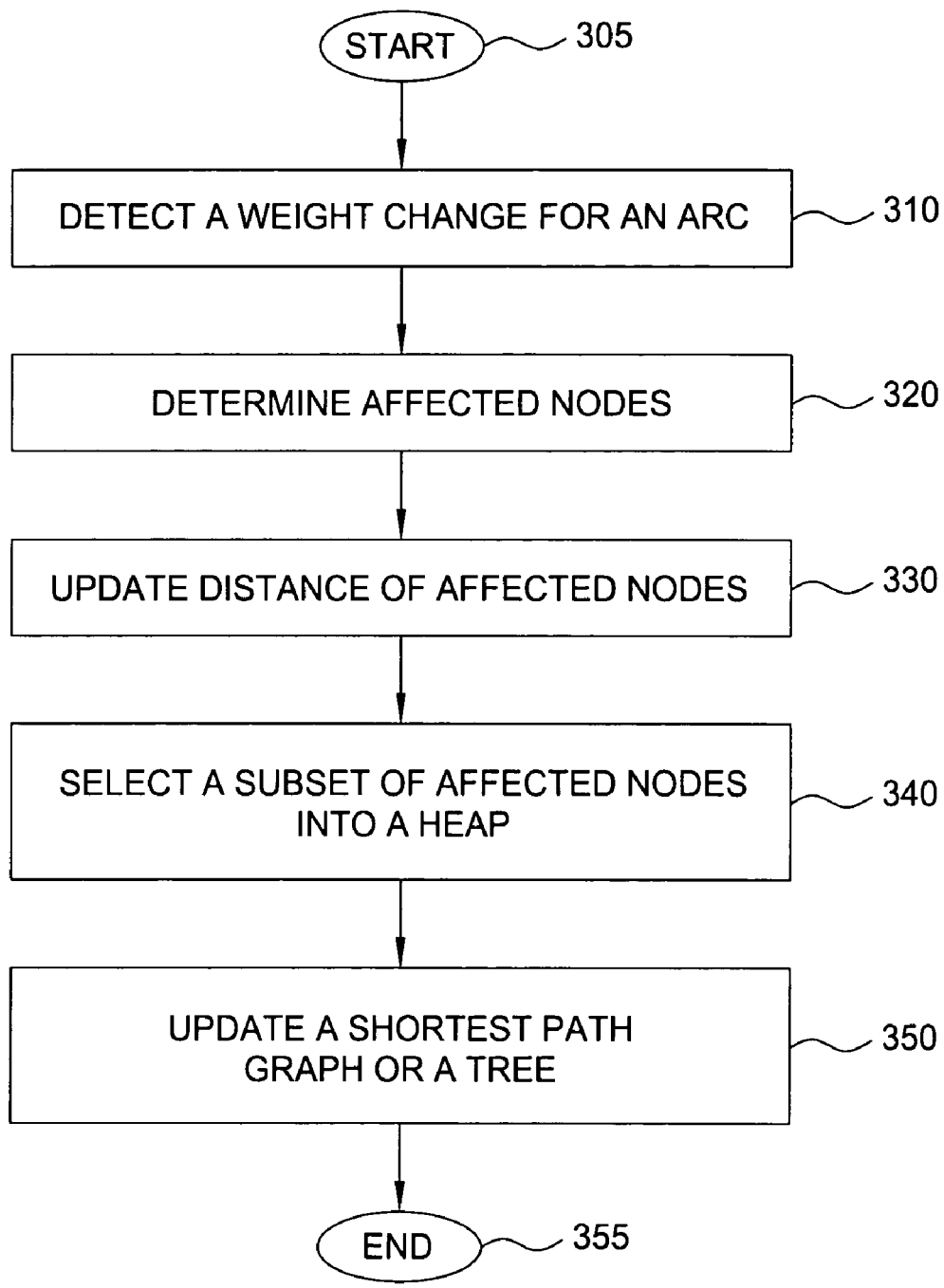
FIG. 3 illustrates a flowchart of a method for accelerating the update of a shortest path graph for networks of the present invention.

FIG. 3 illustrates a flowchart of a method 300 for accelerating the update of a shortest path graph for networks of the present invention. It should be noted that the present method discloses general techniques of reducing the heap size used by the increase algorithms and by the decrease algorithms. As such, FIG. 3 is first used in the description of an increase algorithm and then is used again in the description of a decrease algorithm. Method 300 starts in step 305 and proceeds to step 310.

In step 310, method 300 detects or receives a weight change for an arc, e.g., an increase. The arc weight change can occur for a number of reasons, e.g., changed by an operator of the network, caused by a failure of an arc or a router, congestion in the network, and the like.

In step 320, method 300 determines a plurality of affected nodes. Namely, considering that the weight of an arc a=$\overrightarrow{(u,v)}$ has increased, then a set Q of affected nodes is determined. For example, this set is composed of the nodes that have all their shortest paths traversing arc a. The changes are only applied to these nodes and their incoming and outgoing arcs.

The set Q can remain empty in two situations: if a does not belong to a shortest path, or if it does but u has an alternative shortest path to the destination node. In the first case nothing is done, and in the second case a local update is applied.

In step 330, the method updates the distances of nodes in Q. For example, In case the weight increase affects the distance label of u, the tail node of arc a, a more complex update is required. All nodes that have their distance increased are inserted into a set Q and have their distances set to Δ (instead of being set to ∞ as in standard algorithms), that is the total amount of the original increment of arc a=$\overrightarrow{(u,v)}$. After that, the adjustment $\nabla$ of the distance label of node u is computed. Next, all nodes u∈Q have their distances adjusted downward by an appropriate amount $\Delta$-$\nabla$.

In step 340, method 300 only selects a subset of the affected nodes into a heap. Specifically, the Dijkstra algorithm is applied only for those nodes that have a shorter path, and can thus have their distance label further decreased. Contrary to the present invention, in the standard algorithms, all nodes u∈Q are inserted into a heap H, while the present reduced heap method uses heaps to update only a subset of Q. This distinction is further disclosed below.

In step 350, method 300 updates a shortest path graph (or a tree). For example, in the case of updating a shortest path graph, to identify the arcs that belong to $g^{SP}$, all outgoing arcs of nodes in u∈Q are traversed. Method 300 then ends in this 355.

The present method is now described in the context of being adapted into several increase dynamic shortest path algorithms. First, the present method is adapted into the Ramalingam and Reps algorithm for updating a shortest path graph. Second, the present method is adapted into the Ramalingam and Reps algorithm's specialization for updating trees. Third, the present method is adapted into the King and Thorup algorithm for updating trees. Finally, the present method is adapted into the Demetrescu algorithm for $t^{SP}$. The present disclosures refers to these four standard (std) algorithms as $std_+^{GRR}$, $stdT_+^{RR}$, $stdT_+^{KT}$, and $stdT_+^{D}$ respectively.

High-level pseudo-codes are provided below for various algorithms. Some of the basic operations referred to in the pseudo-codes are now described. These functions are:

HeapMember (H,u): returns 1 if element U is in heap H, and 0 otherwise;

HeapSize (H): returns the number of elements in heap H;

FindAndDeleteMin (H): returns the item in heap H with minimum key and deletes it from H;

InsertIntoHeap (H,u,k): inserts an item U with key k into heap H;

AdjustHeap (H,u,k): if u∈H, changes the key of element it in heap H to k and updates H. Otherwise, u is inserted into H.

In one embodiment, in several points in the algorithm one must scan all outgoing or all incoming arcs of a node. To scan the outgoing arcs of node u, i.e. e=$\overrightarrow{(u,v)}$∈OUT(u), simply scan positions point[u], . . . , point[u+1]−1 of array forward. Similarly, to scan the incoming arcs of node u, i.e.

e=$\overrightarrow{(s,u)}$∈IN(u), simply scan positions reverse[rpoint[u]], . . . , reverse[rpoint[u+1]−1] of array forward.

In one embodiment, the present reduced heap method is applied to the four dynamic shortest path algorithms above. The present disclosure refers to the reduced heap (rh) variants of these algorithms as $rhG_+^{RR}$, $rhT_+^{RR}$, $rhT_+^{KT}$, and $rhT_+^{D}$, respectively. The weight can be increased by any amount. If an explicit arc removal is required, one can simply change its weight to infinity and apply one of the algorithms. They receive as input the arc a, which has the weight increased, the vector w of weights (updated with the weight increase of arc a), and the distance vector d. Furthermore, in the case of an algorithm for updating a shortest path tree, the vector $t^{SP}$ is also an input parameter. When updating a shortest path graph, $g^{SP}$ and $\delta$ are the inputs, instead of $t^{SP}$. The reduced heap variants also receive as input the increment $\Delta$ on arc a. As output they produce the updated input arrays.

Table 1 below shows a pseudo-code for the $rhG_+^{RR}$, the reduced heap variant for the algorithm.

TABLE 1

```
procedure rhG_+^RR (a = (u, v), w, d, δ, g^SP, Δ)
1    if g_a^SP = 0 return;
2    g_a^SP = 0;
3    δ_u = δ_u − 1;
4    if δ_u > 0 then return;
5    Q = {u};
6    for u ∈ Q do
7       d_u = d_u + Δ;
8       for e = (s, u) ∈ IN(u) do
9          if g_e^SP = 1 then
10            g_e^SP = 0;
11            δ_s = δ_s − 1;
12            if δ_s = 0 then Q = Q ∪ {s};
13         end if
14      end for
15   end for
16   if Δ > 1 then
17      dist = d_Q0;
18      for e = (Q_0, v) ∈ OUT(Q_0) do
19         if d_Q0 > d_v + w_e then d_Q0 = d_v + w_e;
20      end for
21      ∇= dist − d_Q0;
22      for u ∈ Q\Q_0 do
23         d_u = d_u −∇;
24         flag = 0;
25         for e = (u, v) ∈ OUT(u) do
26            if d_u > d_v + w_e then
27               d_u = d_v + w_e;
28               flag = 1;
29            end if
30         end for
31         if flag = 1 then InsertIntoHeap(H, u, d_u);
32      end for
33      while HeapSize(H) > 0 do
34         u = FindandDeleteMin(H, d);
35         for e = (s, u) ∈ IN(u) do
36            if d_s > d_u + w_e then
37               d_s = d_u + w_e;
38               AdjustHeap(H, s, d_s);
39            end if
40         end for
41      end while
42   end if
43   for u ∈ Q do
44      for e = (u, v) ∈ OUT(u) do
45         if d_u = w_e + d_v then
46            g_e^SP = 1;
47            δ_u = δ_u + 1;
48         end if
49      end for
50   end for
end rhG_+^RR.
```

In one embodiment, the reduced heap variant of the Ramalingam and Reps method is used for updating a shortest path graph $g^{SP}=(V,E^{SP})$ when the weight of an arc a is increased by $\Delta$. Referring to Table 1, clearly, if arc a is not in the current graph $g^{SP}$, the algorithm stops (line 1). Otherwise, arc a is removed from $g^{SP}$ (line 2) and $\delta_u$ is decremented by one (line 3). If u, the tail node of arc a, has an alternative shortest path (i.e. $\delta_u>0$) to the destination node, then the algorithm stops (line 4). Otherwise, the set Q is initialized with node u (line 5).

The loop in lines 6 to 15 identifies the remaining affected nodes of $g^{SP}$ and adds them to the set Q. For each node u∈Q, its distance is increased by $\Delta$ (instead of being set to ∞ as in the standard approach) (line 7). For each incoming arc e=$\overrightarrow{(s,u)}$ into node u, if e∈$g^{SP}$, e is removed from $g^{SP}$ (line 10) and $\delta_x$ is updated (line 11). If s, the tail node of arc e, has no alternative shortest path to the destination node, it is inserted into set Q (line 12).

In the case of unit weight increase, i.e. $\Delta=1$, the commands from lines 17 to 41 are not executed and the heap H is not used.

Lines 17 to 21 calculate the maximum amount that the distances of nodes u∈Q will decrease by. The present method denotes by $Q_0$ the first element inserted into set Q, which is the tail node of arc a (inserted into Q in line 5). First, the current distance of node $Q_0$ is stored (line 17). Following, all arcs outgoing $Q_0$ are traversed and if an alternative shortest path is identified, $d_{Q_0}$ is updated (line 19). Next, the amount $\nabla$ that the distance of node u decreases (line 21) is computed.

In the loop from line 22 to 32, all nodes from set Q, excluding node $Q_0$, have their distances decreased by $\nabla$ (line 23). Furthermore, the distances of nodes u∈Q/{$Q_0$} with a shortest path linking nodes v∉Q are updated. In the loop from line 25 to 30, all outgoing arcs from nodes u∈Q/{$Q_0$} are traversed. If a shortest path linking nodes outside set Q is found, the distance of node u is updated (line 27) and later (line 31) node u is inserted into heap H.

In the loop from line 33 to 42, nodes u from heap H are removed one by one. All arcs $\vec{e}=(s,u)$ incoming into node u are traversed. In case node s has a shortest path traversing node u, its distance is updated (line 37) and heap H is adjusted (line 38). The loop in lines 43 to 50 restores $g^{SP}$ adding the missing arcs in the shortest paths from nodes u∈Q.

In one embodiment, the reduced heap variant of the Ramalingam and Reps method is used for updating a shortest path tree. The main difference with respect to $G_+^{RR}$ is that $T_+^{RR}$ is specialized to update a shortest path tree $t^{SP}$ rather than a shortest path graph $g^{SP}$. The shortest path tree $t^{SP}$ maintained by $t_+^{RR}$ stores an arc $\vec{a}=(u,v)$ associated with each node u∈V. The arc a is any one from the outgoing adjacency list of node u belonging to a shortest path. The destination node d stores the value 0, i.e. $t_d^{SP}=0$. In the standard algorithm, $t^{SP}$ is updated while the distances are being updated, instead of having a loop just for this purpose, as $stdG_+^{RR}$ has. Furthermore, the set Q of affected nodes is exactly the same as in $stdG_+^{RR}$, but the procedure for identification is slightly different. The main reason is that this algorithm does not maintain a variable δ associated with each node, and the set of outgoing arcs of a node is traversed to verify if it has an alternative shortest path. On the other hand, if an arc $\vec{a}=(u,v)$, incoming an affected node v, is not the one stored in $t^{SP}$, i.e, $t_u^{SP}\neq a$ (even it is a shortest path arc), nothing needs to be done, since it is known that the arc stored in $t_u^{SP}$ represents an alternative shortest path.

In the reduced heap variant the increase amount Δ is an input parameter. As the algorithm updates $t^{SP}$ at the same time that Q is identified, in the case of unit increment ($\Delta=1$) the distances of nodes of set Q increase exactly by one unit, and the algorithm stops as soon as the set Q is totally identified. Otherwise, in case $\Delta>1$, the algorithm uses the approach of the reduced heap, in a similar fashion as $rhG_+^{RR}$.

In one embodiment, the reduced heap variant of the King and Thorup method $T_+^{KT}$ is used for updating a shortest path tree. The main difference with respect to $T_+^{RR}$ is that $T_+^{KT}$ updates a special shortest path tree. It stores, for each node u, the first shortest path arc $\vec{a}=(u,v)$ belonging to the outgoing adjacency list of node u. For example, in FIG. 2, $t_2^{SP}$ must equal two for $T^{KT}$, but it could equal two or three for $T^{RR}$. The advantage of storing this special tree is to be able to find an alternative shortest path for a node s without exploring all outgoing arcs in the set OUT(s). Therefore, during the procedure of identification of set Q, while searching for an alternative shortest path for an affected node s, only a subset OUT(s)⊃$OUT^{KT}$(S) is traversed.

However some extra computational effort is needed to maintain this special tree. When the distances of nodes in Q updated, making use of the heap H, the alternative shortest paths also should be identified to make sure that, in this case, the shortest path arc stored is the first one in the outgoing adjacency list.

In the reduced heap variant of this algorithm, an extra effort is required to store the correct arc in $t^{SP}$. In the case of unit increment, the subset of arcs OUT(S)⊃$OUT^+$(s) of each node s∈Q should be traversed. The subset $OUT^+$(s) is composed of outgoing arcs that are located before the stored arc $t_s^{SP}$ in the outgoing adjacency list. If there is at least one alternative shortest path using arcs of this subset, the first shortest path arc found replaces the current $t_s^{SP}$.

In one embodiment, the reduced heap variant of the Demetrescu method $T_+^D$ is used for updating a shortest path tree. As in $T_+^{RR}$ and $T_+^{KT}$, $T_+^D$ also updates a shortest path tree. The main difference is that $T_+^D$ uses a simpler mechanism for detecting the affected nodes $Q_D$. In other words, it relaxes the notion of affected. However, $|Q^{RR}|=|Q^{KT}|\leq|Q^D|$ for the standard implementations.

Supposing that arc $\vec{a}=(u,v)$ had its weight increased by Δ, set $Q^{RR}$ is composed only of the nodes such that all their shortest paths traverse arc a. Instead, set $Q^D$ is composed of those nodes but also can have some of the nodes that have an alternative shortest path not traversing arc a. The idea is that in graphs where only a few nodes (or none) have alternative shortest paths $|Q^D|\approx|Q^{RR}|$, with the advantage of $Q^D$ being identified using a simpler mechanism. This algorithm is very similar to $stdT_+^{RR}$, differing only in the loop which identifies the set Q. In case e is the outgoing arc of node u in the shortest path tree, i.e. $t_s^{SP}=e$, node s is inserted into Q, even if it has an alternative shortest path to the destination node. The idea of this algorithm is not to waste time looking for an alternative path. This approach provides advantages when the distribution of arc weights is spread out and the probability of ties is low.

The reduced heap variant of this algorithm is very similar to $rhT_+^{RR}$, differing only in how it identifies the set Q. Furthermore, even in the case of unit increment, the additional nodes inserted into set Q are updated making use of a heap.

FIG. 3 illustrates a flowchart of a method 300 for accelerating the update of a shortest path graph for networks of the present invention. FIG. 3 is now used again in the description of a decrease algorithm. Namely, the present method discloses a novel approach of reducing the heap size used by SDP algorithms to update a graph after an arc weight decrease. Method 300 starts in step 305 and proceeds to step 310.

In step 310, method 300 detects or receives a weight change for an arc, e.g., a decrease. The arc weight change can occur for a number of reasons, e.g., changed by an operator of the network, increased link deployment in an arc, and the like.

In step 320, method 300 determines a plurality of affected nodes. Namely, let $\vec{a}=(u,v)$∈E be the arc whose weight is to be decreased. If the weight of an arc a has decreased, then the set Q of affected nodes is determined. In this case, the set Q is composed by all nodes that have at least one shortest path traversing arc a after its weight decrease. The changes are only applied to nodes of Q and their incoming and outgoing arcs. For that, all nodes u∈Q are inserted into a heap H in the standard algorithms.

However, in the reduced heap variants, the set Q is divided in two subsets, Q and U. Q is composed of all nodes that have all their shortest paths traversing arc a. The subset U is composed of nodes whose shortest paths originally did not traverse arc a, but do after the decrement of $w_a$. The idea of reduced heap avoids the use of heaps for updating nodes in Q and only inserts into the heap nodes from set U.

It should be noted that for both standard and reduced heap algorithms, the set Q remains empty in the case that a is not in the shortest path tree before its weight decrease, and afterward it is not inserted or belongs to an alternative shortest path. In other words, Q remains empty if the decrease does not affect the distance label of any node. Also, the subset U is used only if Q is not empty. In case $|Q|>0$, U remains empty in the case no node $u \notin Q$ has an alternative shortest path linking nodes $u \in Q$.

In step 330, the method updates the distances of nodes. Initially, the shortest paths are updated considering nodes in Q. Next, they are updated considering nodes belonging to set U. The decrease amount $\nabla$ is computed prior to determining set Q. Since set Q contains all nodes with at least one shortest path traversing arc a, the present method decreases the distance label of these nodes by exactly $\nabla$, without using heaps. However, heaps are needed to compute distance labels of nodes $u \in U$ in step 340.

In step 350, method 300 updates a shortest path graph (or a tree). For example, in the case of updating a shortest path graph, to identify the arcs that belong to $g^{SP}$, all outgoing arcs of nodes in $u \in Q$ are traversed. Method 300 then ends in this 355.

The present method is now again described in the context of being adapted into several decrease dynamic shortest path algorithms for arc weight decrease. The weight can be decreased by any amount. The present disclosure refers to these algorithms as stdG_$^{RR}$, stdT_$^{RR}$, and stdT_$^{KT}$. The reduced heap variants of these algorithms are denoted by rhG_$^{RR}$, rT_$^{RR}$, and rhT_$^{KT}$.

Table 2 below shows a pseudo-code for the rhG_$^{RR}$, the reduced heap variant for the algorithm.

TABLE 2

```
procedure rhG_RR Ph1 (a = (u,v), w_E, d_V, δ_V, g^SP)
1   if d_u < d_v + w_a then return;
2   if d_u = d_v + w_a then
3       g_a^SP = 1;
4       δ_u = δ_u + 1;
5       return;
6   end if
7   ∇ = d_u − d_v − w_a;
8   d_u = d_u − ∇;
9   Q = {u};
10  degree_u = δ_u − 1;
11  for u ∈ Q do
12      for e = (s, u) ∈ IN(u) do
13          if g_e^SP = 1 then
14              if degree_s = 0 then
15                  d_s = d_s − ∇;
16                  Q = Q ∪ {s};
17                  degree_s = δ_s − 1;
18              end if
19              else degree_s = degree_s − 1;
20          end if
21          else if ∇ = 1 and d_s = d_u + w_e then
22              g_e^SP = 1;
23              δ_s = δ_s + 1;
24          end if
25      end for
26  end for
27  for u ∈ Q do
28      if degree_u > 0 then
29          degree_u = 0;
```

TABLE 2-continued

```
30          for e = (u, v) ∈ OUT(u) do
31              if g_e^SP = 1 and d_u < d_v + w_e then
32                  g_e^SP = 0;
33                  δ_u = δ_u − 1;
34              end if
35          end for
36      end if
37  end for
38  if ∇ = 1 return;
39  for u ∈ Q do
40      for e = (s, u) ∈ IN(u) do
41          if g_e^SP = 0 then
42              if d_s = d_u + w_e then
43                  g_e^SP = 1;
44                  δ_s = δ_s + 1;
45              end if
46              else if d_s > d_u + w_e then
47                  d_s = d_u + w_e;
48                  AdjustHeap(H, s, d_s);
49              end if
50          end if
51      end for
52  end for
end rhG_RR Ph1.
```

In one embodiment, the reduced heap variant of the Ramalingam and Reps G_$^{RR}$ method is used for updating a shortest path graph $g^{SP}=(V,E^{SP})$ when the weight of an arc a is decreased. Recall that $a=\overrightarrow{(u,v)} \in E$ is the arc whose weight is decreased. If $d_u$ remains unchanged, the algorithm stops (line 1). Otherwise, if node u has an alternative shortest path traversing arc a, a is inserted in $g^{SP}$ (line 3), the variable $\delta_u$ is updated (line 4), and the algorithm stops (line 5). In line 7 the amount $\nabla$, by which the distance of node u will be decreased is calculated. The distance of node u is decreased by $\nabla$ (line 8), it is inserted into set Q (line 9) and degree$_u$ is initialized (line 10). The array degree is used to avoid inserting a node u into set Q more than once. Furthermore, degree is used to identify nodes in Q having alternative shortest paths not traversing arc a.

The loop in lines 11 to 26 identifies nodes $u \in Q$, making use of the array degree and updates $g^{SP}$ in the case of unitary decrement. For each node $u \in Q$ all incoming arcs $e=\overrightarrow{(s,u)}$ are scanned. If $e \notin g^{SP}$ and if degree$_s$=0, then vertex s has its distance decreased by $\nabla$ (line 15), s is inserted into set Q (line 16), and degree$_s$ receives the value $\delta_s$−1 (line 17). Otherwise, if $e \in g^{SP}$ but degree$_s$>0, then degree$_s$ is decremented by one unit (line 19). In the case of unit decrement, arrays $g^{SP}$ and $\delta$ are updated in lines 22 and 23, respectively.

If a node $u \in Q$ has one or more alternative shortest paths not traversing arc a, these paths are no longer shortest after the weight of arc is reduced and must be removed from the shortest path graph. The existence of an alternative path is determined making use of array degree. The loop in lines 27 to 37 removes these paths by analyzing each node $u \in Q$, one at a time. If one or more alternative paths from node u are detected, then degree$_u$ is reset to 0 (line 29), and in the loop in line 30 to 35, all outgoing arcs $e=\overrightarrow{(u,v)}$ from u are scanned. If arc e is no longer in the shortest path, it is removed (line 32) and the number of outgoing arcs from u($\delta_u$) is updated (line 33).

In the case of unit decrement, the algorithm stops in line 38.

In the loop from line 39 to 52, all incoming arcs $e=\overrightarrow{(s,u)}$ into node $u \in Q$ are scanned. The test in line 41 permits the algorithm to avoid testing arcs $e=\overrightarrow{(s,u)}$ where $s \in Q$ and $e \in g^{SP}$. In one embodiment, an indicator array of nodes in set Q is not maintained, which would allow the present method to avoid testing arcs $\vec{e}=(s,u)$ where $s \in Q$ and $e \notin g^{SP}$ because any savings associated with its use does not appear to outweigh the computational effort associated with its housekeeping. In lines 42 to 45, if node s has an alternative shortest path traversing arc e, e is inserted into $g^{SP}$ (line 43) and δ is updated (line 44). If $d_s$ decreases transversing arc a, then it is updated (line 47) and H adjusted (line 48).

Recall that phase 1 of the algorithm identifies the set Q, containing all nodes that have at least one shortest path traversing arc a, and updates the part of the graph which contains these nodes. Furthermore, all nodes $s \in U$ with an alternative shortest path linking set Q are identified and if d, is reduced, s is inserted into the heap H. The second phase updates the remaining affected part of the graph, i.e. the nodes that now have a shortest path through arc a, which had its weight decreased, but do not have an arc linking directly to a node in Q.

In one embodiment, the reduced heap variant of the Ramalingam and Reps $T\_^{RR}$ method is used for updating a shortest path tree. Namely, the algorithm is a specialization of the Ramalingam and Reps algorithm ($G\_^{RR}$) restricted to updating a shortest path tree. This algorithm is simpler than $G\_^{RR}$, since the $t^{SP}$ can be updated while the set Q is being identified. The set Q is identified with use of a heap H, and the procedure only requires one scan in each incoming arc into the affected nodes.

The reduced heap variant requires a more complex implementation. To differentiate the nodes in set U from the ones in set Q, a variable maxdiff is used. The value $maxdiff_u$ of a node u is zero, in case the node belongs to the set Q, and diff in case it belongs to set U. The value diff corresponds to the amount of its distance that was decreased. Initially a node can belong to U, but as soon as its decreased distance is equal to ∇, it is inserted into set Q. In this case the node is not removed from U, but the corresponding value of maxdiff is set to zero. Next, only the nodes from U, with a positive value of maxdiff, are updated using a heap.

In one embodiment, the reduced heap variant of the King and Thorup $T\_^{KT}$ method is used for updating a shortest path tree. The difference from $T\_^{RR}$ is that $T\_^{KT}$ updates a special shortest path tree. For example, algorithm $T\_^{KT}$ stores, for each node, the first arc from the outgoing adjacency list belonging to one of the shortest paths.

In one embodiment, when the algorithm needs to determine if a node u has an alternative shortest path, the algorithm does not scan the entire set of outgoing nodes OUT(u). Rather, it scans arcs $\vec{e}=(u,v) \in OUT_e^{KT}(u) \subseteq OUT(u)$. Let e=$(u,v) \in OUT(u)$ be the arc corresponding to entry $t_u^{SP}$. The set $OUT_e^{KT}(U)$ is made up of the arcs forward[e+1], ..., forward [point[u+1]−1].

In one embodiment, set Q is stored as a |V|-array where $Q_i$ is the i-th element of the set. Set U is represented is a similar fashion.

Figure 4:
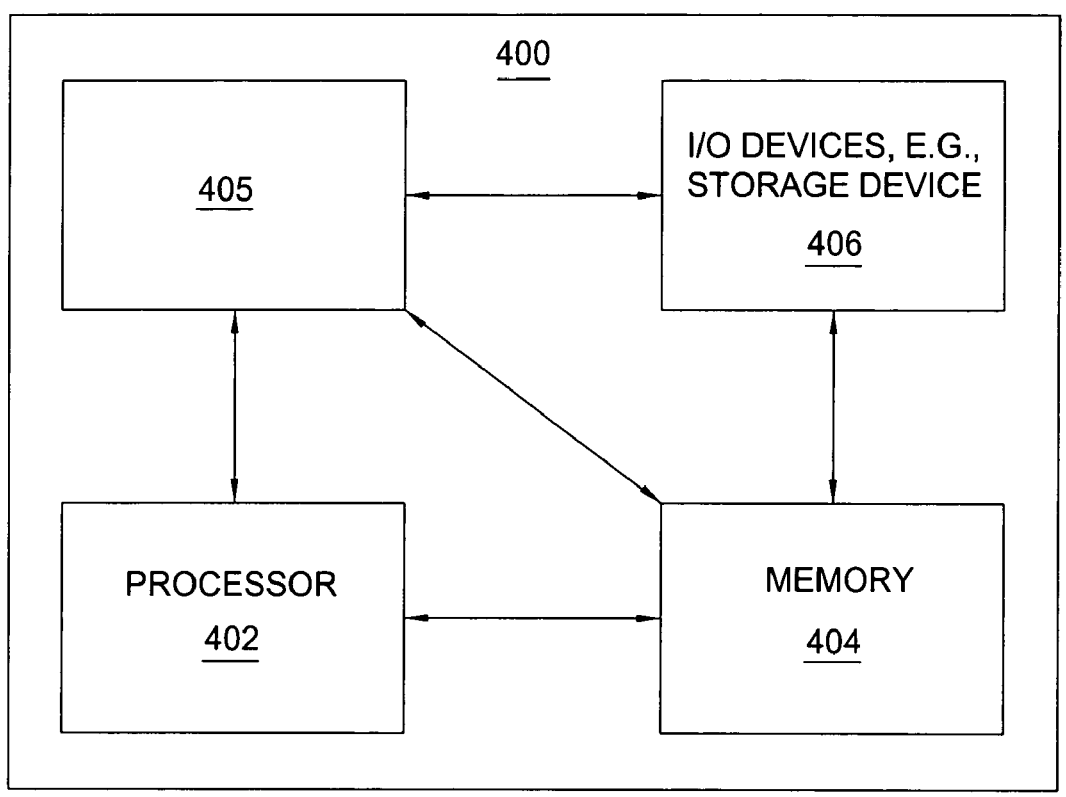
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for updating a shortest path graph or tree for packet networks, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for updating a shortest path graph or tree for packet networks can be loaded into memory 404 and executed by processor 402 to implement the functions as discussed above. As such, the present process 405 for updating a shortest path graph or tree for packet networks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for updating a shortest path graph or a shortest path tree for a packet network having a plurality of nodes, comprising:

detecting by a processor a change in a weight for an arc in the packet network;

determining by said processor a plurality of affected nodes that are affected by said change in said weight;

updating by said processor a distance of each of said plurality of affected nodes;

selecting by said processor a subset of said plurality of affected nodes for placement in a heap comprising a priority queue, wherein each affected node that is selected for placement in said heap has a distance change that is smaller than said change in said weight of said arc; and updating by said processor the shortest path graph or the shortest path tree in accordance with said subset of said plurality of affected nodes that has been placed in said heap.

2. The method of claim 1, wherein said packet network is an Internet Protocol network.

3. The method of claim 1, wherein said updating the shortest path graph or the shortest path tree comprises applying a Dijkstra's algorithm to said subset of said plurality of affected nodes.

4. The method of claim 1, wherein said change comprises an increase in said weight.

5. The method of claim 1, wherein said change comprises a decrease in said weight.

6. The method of claim 1, wherein said updating said distance comprises updating said distance in accordance with a shortest path based routing protocol.

7. A computer-readable volatile or non-volatile storage medium having stored thereon a plurality of instructions, the plurality of instructions including instructions which, when executed by a processor, cause the processor to perform the steps of a method for updating a shortest path graph or a shortest path tree for a packet network having a plurality of nodes, comprising:

detecting a change in a weight for an arc in the packet network;

determining a plurality of affected nodes that is affected by said change in said weight;

updating a distance of each of said plurality of affected nodes;

selecting a subset of said plurality of affected nodes for placement in a heap comprising a priority queue, wherein each affected node that is selected for placement in said heap has a distance change that is smaller than said change in said weight of said arc; and updating the shortest path graph or the shortest path tree in accordance with said subset of said plurality of affected nodes that has been placed in said heap.

8. The computer-readable medium of claim 7, wherein said packet network is an Internet Protocol network.

9. The computer-readable medium of claim 7, wherein said updating the shortest path graph or the shortest path tree comprises applying a Dijkstra's algorithm to said subset of said plurality of affected nodes.

10. The computer-readable medium of claim 7, wherein said change comprises an increase in said weight.

11. The computer-readable medium of claim 7, wherein said change comprises a decrease in said weight.

12. The computer-readable medium of claim 7, wherein said updating said distance comprises updating said distance in accordance with a shortest path based routing protocol.

13. An apparatus for updating a shortest path graph or a shortest path tree for a packet network having a plurality of nodes, comprising:

means for detecting a change in a weight for an arc in the packet network;

means for determining a plurality of affected nodes that is affected by said change in said weight;

means for updating a distance of each of said plurality of affected nodes;

means for selecting a subset of said plurality of affected nodes for placement in a heap comprising a priority queue, wherein each affected node that is selected for placement in said heap has a distance change that is smaller than said change in said weight of said arc; and means for updating the shortest path graph or the shortest path tree in accordance with said subset of said plurality of affected nodes that has been placed in said heap.

14. The apparatus of claim 13, wherein said updating means updates the shortest path graph or the shortest path tree by applying a Dijkstra's algorithm to said subset of said plurality of affected nodes.

15. The apparatus of claim 13, wherein said change comprises an increase in said weight or a decrease in said weight.

\* \* \* \* \*